US007535281B2

(12) United States Patent
Olsen (10) Patent No.: US 7,535,281 B2
(45) Date of Patent: May 19, 2009

(54) REDUCED TIME CONSTANT CHARGE PUMP AND METHOD FOR CHARGING A CAPACITIVE LOAD

(75) Inventor: Espen Olsen, Irvine, CA (US)

(73) Assignee: Micron Technology, Inc., Boise, ID (US)

( * ) Notice: Subject to any disclaimer, the term of this patent is extended or adjusted under 35 U.S.C. 154(b) by 101 days.

(21) Appl. No.: 11/540,857

(22) Filed: Sep. 29, 2006

(65) Prior Publication Data

US 2008/0079479 A1    Apr. 3, 2008

(51) Int. Cl.
   *G05F 1/10*   (2006.01)
   *G05F 3/02*   (2006.01)
(52) U.S. Cl. ............................ 327/536; 363/59; 363/60
(58) Field of Classification Search ................ 327/536; 363/59–60
   See application file for complete search history.

(56) References Cited

U.S. PATENT DOCUMENTS

| | | | | |
|---|---|---|---|---|
| 4,792,705 A | 12/1988 | Ouyang et al. | ............ | 307/296 R |
| 4,829,391 A | 5/1989 | Vargas, Jr. | .................... | 360/51 |
| 4,847,519 A | 7/1989 | Wahl et al. | ............... | 307/296.2 |
| 5,075,572 A | 12/1991 | Poteet et al. | ................ | 307/350 |
| 5,187,421 A * | 2/1993 | Naito | .......................... | 363/59 |
| 5,212,456 A | 5/1993 | Kovalcik et al. | ............ | 330/261 |
| 5,359,299 A | 10/1994 | Webster | ......................... | 331/8 |
| 5,363,066 A | 11/1994 | Chen et al. | .................... | 331/17 |
| 5,493,543 A | 2/1996 | Kamens | ....................... | 368/255 |
| 5,523,724 A | 6/1996 | Assar et al. | ................. | 331/1 A |
| 5,581,455 A | 12/1996 | Rossi et al. | .................... | 363/60 |
| 5,621,689 A | 4/1997 | Sakakibara et al. | .... | 365/189.09 |
| 5,663,689 A | 9/1997 | Baumgartner et al. | ......... | 331/17 |
| 5,767,736 A | 6/1998 | Lakshmikumar et al. | .... | 327/536 |
| 5,796,600 A | 8/1998 | Yun | ............................. | 363/60 |
| 5,818,288 A | 10/1998 | Le et al. | ..................... | 327/536 |
| 5,912,575 A | 6/1999 | Takikawa | ..................... | 327/157 |
| 5,945,855 A | 8/1999 | Momtaz | ..................... | 327/157 |
| 6,075,406 A | 6/2000 | Lee et al. | .................... | 327/538 |
| 6,137,344 A | 10/2000 | Miki | .......................... | 327/536 |
| 6,140,630 A * | 10/2000 | Rhodes | .................... | 250/208.1 |
| 6,147,561 A | 11/2000 | Rhee et al. | .................... | 331/12 |
| 6,229,345 B1 | 5/2001 | Kirkland et al. | ............... | 327/65 |
| 6,229,361 B1 | 5/2001 | Henwood | .................... | 327/145 |
| 6,344,959 B1 | 2/2002 | Milazzo | ....................... | 361/92 |
| 6,362,632 B1 | 3/2002 | Livingston | ................... | 324/661 |
| 6,400,211 B1 * | 6/2002 | Yokomizo et al. | ........... | 327/536 |
| 6,404,290 B1 | 6/2002 | Voo | ................................ | 331/8 |
| 6,456,151 B1 | 9/2002 | Pontarollo | ................... | 327/536 |

(Continued)

*Primary Examiner*—Tuan Lam
*Assistant Examiner*—Diana J Cheng
(74) *Attorney, Agent, or Firm*—Dorsey & Whitney LLP (57) ABSTRACT

A charge pump and method converts an input voltage to a boosted voltage having a magnitude or polarity that is different from that of the input voltage. The input voltage is adjusted so that it has a relatively large magnitude until the boosted voltage approaches a target voltage. Therefore, the charge pump and method can more quickly charge a capacitive load. The magnitude of the input voltage may be proportional to the difference between the magnitude of a reference voltage and the magnitude of the boosted voltage. The magnitude of the input voltage may alternatively be substantially equal to the magnitude of a supply voltage until the magnitude of the boosted voltage is within a predetermined range of the target voltage, at which point it may be proportional to the difference between the magnitude of a reference voltage and the magnitude of the boosted voltage.

24 Claims, 4 Drawing Sheets

U.S. PATENT DOCUMENTS

| | | | |
|---|---|---|---|
| 6,462,523 B1 | 10/2002 | Wannenmacher | 323/282 |
| 6,466,069 B1 | 10/2002 | Rozenblit et al. | 327/157 |
| 6,556,067 B2 | 4/2003 | Henry | 327/536 |
| 6,603,673 B2 | 8/2003 | Yamamoto | 363/60 |
| 6,611,161 B1 | 8/2003 | Kumar et al. | 327/157 |
| 6,611,166 B2 | 8/2003 | Chan et al. | 327/536 |
| 6,717,446 B1 | 4/2004 | Vu | 327/157 |
| 6,724,241 B1 | 4/2004 | Bedarida et al. | 327/536 |
| 6,844,762 B2 | 1/2005 | Sanchez | 327/157 |
| 6,859,091 B1 | 2/2005 | Nicholson et al. | 327/536 |
| 6,894,570 B2 | 5/2005 | Liang | 331/17 |
| 6,897,690 B2 | 5/2005 | Keaveney et al. | 327/148 |
| 6,897,709 B2 | 5/2005 | Henry | 327/536 |
| 6,937,075 B2 | 8/2005 | Lim et al. | 327/157 |
| 6,958,637 B2 | 10/2005 | Feng | 327/157 |
| 7,005,896 B2 | 2/2006 | Chen et al. | 327/112 |
| 7,034,601 B2 | 4/2006 | Carmina et al. | 327/536 |
| 7,176,748 B2 | 2/2007 | Khouri et al. | 327/536 |
| 7,184,284 B2 * | 2/2007 | Yan | 363/59 |
| 7,215,003 B2 | 5/2007 | Tanaka et al. | 257/532 |
| 2006/0202741 A1 * | 9/2006 | Tran et al. | 327/536 |
| 2007/0091655 A1 * | 4/2007 | Oyama et al. | 363/59 |

\* cited by examiner

REDUCED TIME CONSTANT CHARGE PUMP AND METHOD FOR CHARGING A CAPACITIVE LOAD

TECHNICAL FIELD

This invention relates generally to charge pumps, and, more particularly, to a charge pump that more quickly charges a large capacitive load to a reference voltage.

BACKGROUND OF THE INVENTION

In many electronic devices, it is necessary to generate a voltage having a magnitude that is greater than the magnitude of a supply voltage providing power to the device. In other applications, it is necessary to generate a voltage having a polarity that is different from the polarity of a supply voltage providing power to the device. Charge pumps are often used for both of these purposes. Although a wide variety of charge pumps have been developed, most charge pumps use capacitors to obtain a boosted voltage or a voltage having a different polarity. To generate a boosted voltage, the supply voltage $V_{CC}$ is typically applied to a first terminal of the capacitor while the second terminal of the capacitor is held at ground during a first phase of a cycle. After the capacitor has been charged to $V_{CC}$, the first terminal of the capacitor is coupled to a load that is to receive the boosted voltage, and the supply voltage $V_{CC}$ is applied to the second terminal of the capacitor during a second phase of the cycle. In so far as the capacitor was charged to $V_{CC}$ during the first phase when the second terminal was connected to ground, the voltage on the first terminal is approximately twice $V_{CC}$ during the second phase when the second terminal is connected to $V_{CC}$. The charge pump repetitively alternates between the first and second phases, each cycle generating an output voltage that is approximately twice the supply voltage $V_{CC}$. By using multiple boost stages, output voltages that are a larger multiple of the supply voltage $V_{CC}$ can be generated.

To generate a voltage having a polarity that is different from the polarity of the supply voltage $V_{CC}$, the capacitor is typically charged in the same manner as described above, but the terminals connected in a different manner during the second phase of each cycle. Specifically, during the first phase, the supply voltage $V_{CC}$ is again applied to the first terminal of the capacitor while the second terminal of the capacitor is held at ground. After the capacitor has been charged to $V_{CC}$, the first terminal of the capacitor is coupled to ground, and the second terminal of the capacitor is connected to the load that is to receive the opposite polarity voltage during the second phase. In so far as the capacitor was charged to $V_{CC}$ during the first phase when the second terminal was connected to ground, the voltage on the second terminal is approximately $-V_{CC}$ during the second phase when the first terminal is connected to ground.

Charge pumps are presently used in a wide variety of applications. For example, charge pumps are typically used in memory devices to provide a negative substrate voltage or to provide a boosted voltage that can be applied to the gate of an NMOS transistor to allow the transistor to couple the supply voltage to an output node. Charge pumps are also used in CMOS imagers to generate voltage of different polarities and magnitudes during various operations carried out by the imagers. For example, charge pumps are commonly used to supply power having a polarity that is different from that of the supply voltage to the imaging array of CMOS imagers.

Figure 1:
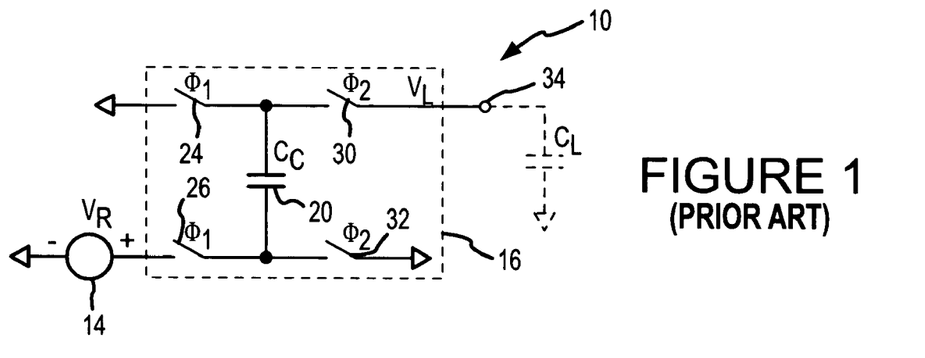
FIG. 1 is a schematic diagram of a conventional charge pump.

A typical charge pump 10 that can be used to supply a negative voltage when powered by a positive supply voltage is shown in FIG. 1. The charge pump 10 includes a source 14 of a reference voltage $V_R$, which is applied to a voltage boost circuit 16 formed by a capacitor 20 having a capacitance $C_C$, two switches 24, 26 that are closed during the first phase of each cycle, and two switches 30, 32 that are closed during the second phase of each cycle. A load L is connected to an output node 34 of the charge pump 10. The switches 24, 26 that are closed during the first phase of each cycle are open during the second phase, and the switches 30, 32 that are closed during the second phase are open during the first phase. The load L is assumed to be the array of a CMOS imager, which is highly capacitive, with a capacitance of $C_L$. The voltage across the capacitive load $C_L$ is designated $V_L$.

In operation, the reference voltage source 14 is connected to the capacitor 20 by the switch 26 during the first phase of each cycle, while the switch 24 connects the other terminal of the capacitor 20 to ground. The capacitor 20 is therefore charged to $-V_R$ during the first phase. During the second phase of each cycle, the switch 32 is closed to connect the lower terminal of the capacitor 20 to ground, and the other switch 30 is closed to connect the other terminal of the capacitor 20 to the load L. Insofar as the capacitor 20 was charged to $-V_R$, the capacitive load $C_L$ is eventually charged to $-V_R$ after a sufficient number of cycles.

The time required for a charge pump, including the charge pump 10 shown in FIG. 1, to output a target voltage is sometimes referred to as the time constant of the charge pump. In general the time constant of a charge pump driving a resistive load is very short as long as the current demands of the load do not exceed the current that can be supplied by the charge pump. However, the time constant of a charge pump driving a capacitive load can be very long because the voltage applied to the load incrementally increases through a charge sharing process each cycle. The time constant of the charge pump 10 is affected by the magnitude of the capacitance $C_C$ relative to the load capacitance $C_L$, as well as the difference between the reference voltage $V_R$ and the voltage $V_L$ to which the capacitive load $C_L$ has already been charged. Specifically, the change $\Delta V$ in the load voltage $V_L$ when driven by the charge pump 10 is given by the formula:

$$\Delta V = [C_C/(C_C+C_L)]^*[V_R-V_L]. \quad \text{Equation 1}$$

It is thus seen that the incremental increase $\Delta V$ in the load voltage $V_L$ each cycle is proportional to two factors. The first factor is the difference between the reference voltage $V_R$ supplied by the charge pump 10 and the load voltage $V_L$ at the start of the cycle. The second factor is the ratio of the charge pump capacitance $C_C$ to the sum of the charge pump capacitance $C_C$ and the load capacitance $C_L$. If the load capacitance $C_L$ is very much greater than the charge pump capacitance $C_C$, Equation 1 can be effectively simplified to:

$$\Delta V = [C_C/C_L]^*[V_R-V_L]. \quad \text{Equation 2.}$$

In such case, the incremental increase $\Delta V$ in the load voltage $V_L$ is proportional to the ratio of the charge pump capacitance $C_C$ to the load capacitance $C_L$ as well as to the difference between the reference voltage $V_R$ and the load voltage $V_L$.

It can be seen from Equation 2 that incremental increase $\Delta V$ of the load voltage $V_L$ will be very small if the load capacitance $C_L$ is significantly greater than the charge pump capacitance $C_C$. It can also be seen from Equation 2 that the increase $\Delta V$ of the load voltage $V_L$ will become smaller as the load voltage $V_L$ approaches the reference voltage $V_R$. Both of these factors can result in very large time constants for charge pumps driving a large capacitive load. This problem is particularly severe for charge pumps supplying power to CMOS imagers having a polarity that is different from that of the supply voltage because, as mentioned above, the imaging array receiving such voltage has a very large capacitance. As a result, the time constant of charge pumps supplying power to the arrays of CMOS imagers can be undesirably long.

There is therefore a need for a charge pump having a shorter time constant, particularly when the charge pump is driving a highly capacitive load.

DETAILED DESCRIPTION

Figure 2:
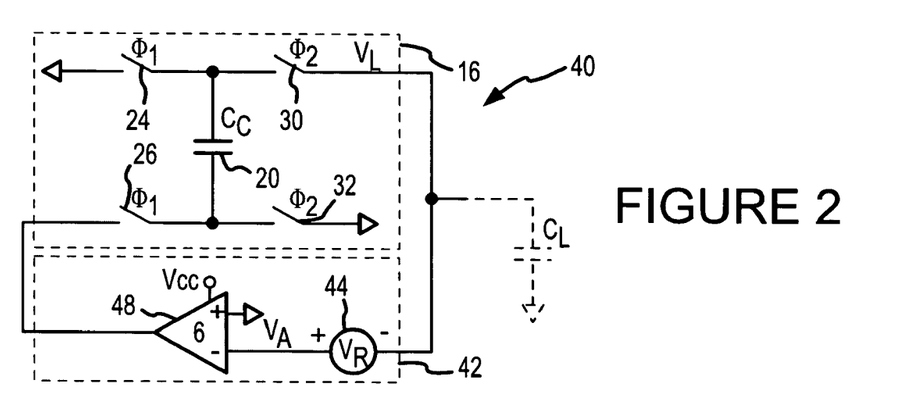
FIG. 2 is a schematic diagram of a charge pump according to one example of the invention.

A charge pump 40 according to one example of the invention is shown in FIG. 2. The charge pump 40 includes the same voltage boost circuit 16 used in the charge pump of FIG. 1, including the capacitor 20 and the switches 24, 26, 30, 32, and they operate in essentially the same manner. However, instead of using the reference voltage source 14 (FIG. 1), the charge pump 40 uses a reference voltage circuit 42 that includes a reference voltage source 44 producing a reference voltage $V_R$, and a differential amplifier 48. The differential amplifier 48 preferably has a gain G of greater than unity, and more preferably has a gain G that is substantially greater than unity.

In operation, the voltage $V_L$ is assumed to be initially zero voltage when the charge pump 40 is initialized. As a result, the reference voltage generator applies a voltage of $V_R$ to the positive input of the differential amplifier 48. The negative input of the differential amplifier 48 is connected to ground so that the amplifier 48 outputs a voltage of $G^*V_R$ or $V_{CC}$, whichever has a lower magnitude. For example, if $V_R$ is equal to 2 volts, G is equal to 50, and $V_{CC}$ is equal to 10 volts, the amplifier 48 will output a voltage of 10 volts. As a result, the capacitor 20 will be charged to −10 volts before the switch 30 couples it to the highly capacitive load $C_L$. Insofar as this voltage is substantially higher than the reference voltage $V_R$, the charge pump 40 will charge the capacitive load $C_L$ substantially faster than the charge pump 10 was able to charge the load L.

As the capacitive load $C_L$ becomes more negatively charged, the voltage $V_L$ becomes more negative. As the voltage $V_L$ decreases, the voltage $V_A$ applied to the input of the differential amplifier 48 decreases since the voltage $V_A$ applied to the amplifier is given by the equation $V_A=V_L+V_R$. Thus, using the above example in which $V_R$ is equal to 2 volts, when the voltage $V_L$ has decreased to −1 volt, the voltage $V_A$ will be 1 volt. However, unlike the charge pump 10 of FIG. 1, the voltage to which the capacitor 20 is charged does not immediately decrease as the voltage $V_L$ decreases. In fact, the capacitor 20 will continue to be charged to $-V_{CC}$ until $G^*V_A$ is substantially equal to the supply voltage $V_{CC}$, i.e., $G^*(V_L+V_R)=V_{CC}$. Again using the above example, the capacitor 20 will continue to be charged to −10 volts until $50(V_L+2)=10$, or $V_L=-1.8$ volts. In contrast, using the same value of $V_R=2$, the capacitor 20 used in the charge pump 10 of FIG. 1 is charged to only −0.2 volts when $V_L=-1.8$ volts.

When $G^*(V_L+V_R)=-V_{CC}$, i.e., $V_L=-1.8$ using the above example, the negative voltage to which the capacitor 20 is charged will be gradually reduced until the capacitor is charged to a voltage that causes the voltages to be stable. In such case, the voltage at the output of the amplifier, i.e., $G^*(V_L+V_R)$, will be equal to $-V_L$, i.e., $G^*(V_L+V_R)=-V_L$. Solving for $V_L$ yields $V_L=-V_R[G/(G+1)]$. Again, using the above example, the voltages in the charge pump 40 will be stable when $V_L=-2[50/51]$ or −1.96 volts. Compared to the charge pump 10, the much greater voltage to which the capacitor 20 is charged in the charge pump 40 throughout the initialization of the charge pump 40 results in a markedly faster time constant.

The devices for implementing the switches 24, 26, 30, 32 are conventional as are circuitry for controlling them during the first and second phases of each cycle. Therefore, in the interest of brevity and to avoid obscuring the explanation of the more pertinent portions of the charge pump 40, a more detailed explanation of these devices and control circuits have been omitted.

Figure 3:
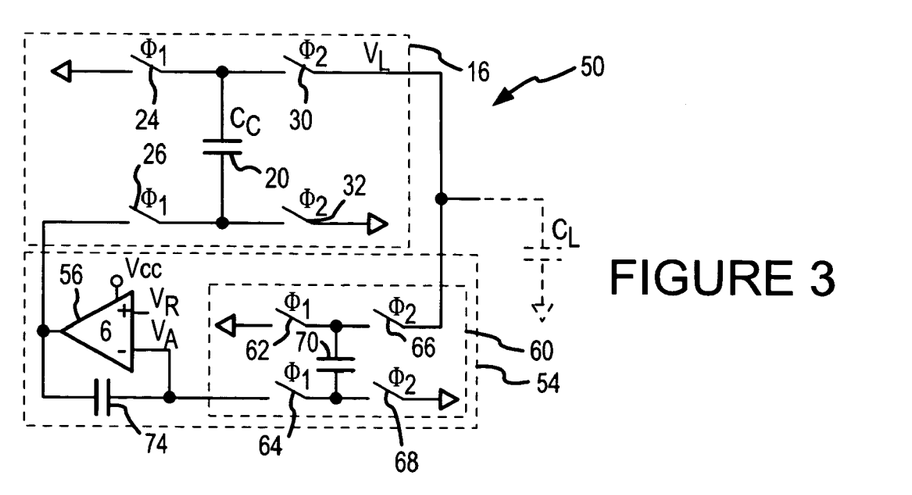
FIG. 3 is a schematic diagram of a charge pump according to another example of the invention.

A charge pump 50 according to another example of the invention is shown in FIG. 3. The charge pump 50 is identical to the charge pump 40 shown in FIG. 2 except that it uses a different reference voltage circuit 54. The reference voltage circuit 54 includes a differential amplifier 56 receiving a reference voltage $V_R$ at its positive input. The negative input of the amplifier 56 is connected to a boosting sample circuit 60 formed by two switches 62, 64 that are closed only during the first phase of each cycle, two switches 66, 68 that are closed only during the second phase of each cycle, and a capacitor 70 that retains a sample during the first phase when the switches 66, 68 are opened. A capacitor 74 connected between the output and the negative input of the amplifier 56 retains the voltage corresponding to the sample when the switches 62, 64 are opened during the second phase of each cycle.

In operation, during the first phase of each cycle, a voltage at the output of the amplifier 56 charges the capacitor 20 through the switch 26. At the same time, a sample of the load voltage $V_L$ obtained during the second phase of the prior cycle is coupled to the negative input of the amplifier 56 through the closed switches 62, 64 and retained by the capacitor 74. However, the sample applied to the amplifier 74 has a polarity that is the reverse of the polarity of the load voltage $V_L$. During the second phase of the prior cycle, the upper terminal of the capacitor is connected to the load L through the switch 66, and the lower terminal of the capacitor is connected to ground through the switch 68. During the first phase when the sample is applied to the amplifier 56, the upper terminal of the capacitor 70 is switched from the load voltage $V_L$, which is a negative voltage, to ground. As a result, the voltage at the lower terminal of the capacitor 70 transitions from ground to a positive voltage that is equal in magnitude to the negative load voltage $V_L$. The amplifier 56 then applies a voltage to the capacitor 20 through the switch 26 that is the lesser of the supply voltage $V_{CC}$ or $G(V_R+V_L)$. For example, if $V_R$ is again 2 volts, G is again 50, and $V_{CC}$ is again 10 volts, the amplifier 56 will output 10 volts until $V_L=-1.8$ volts. Thereafter, the voltage output by the amplifier 56 will decrease linearly as $V_L$ transitions from −1.8 volts toward −2 volts.

During the second phase of each cycle, the negative of the voltage applied to the capacitor 20 is applied to the load L through the switch 30 as described above. At the same time, the switches 66, 68 are closed to charge the capacitor 70 to the load voltage $V_L$. The switches 62, 64 are open during this time, but the sample voltage applied to the amplifier 56 during the first phase is retained by the capacitor 74.

Figure 4:
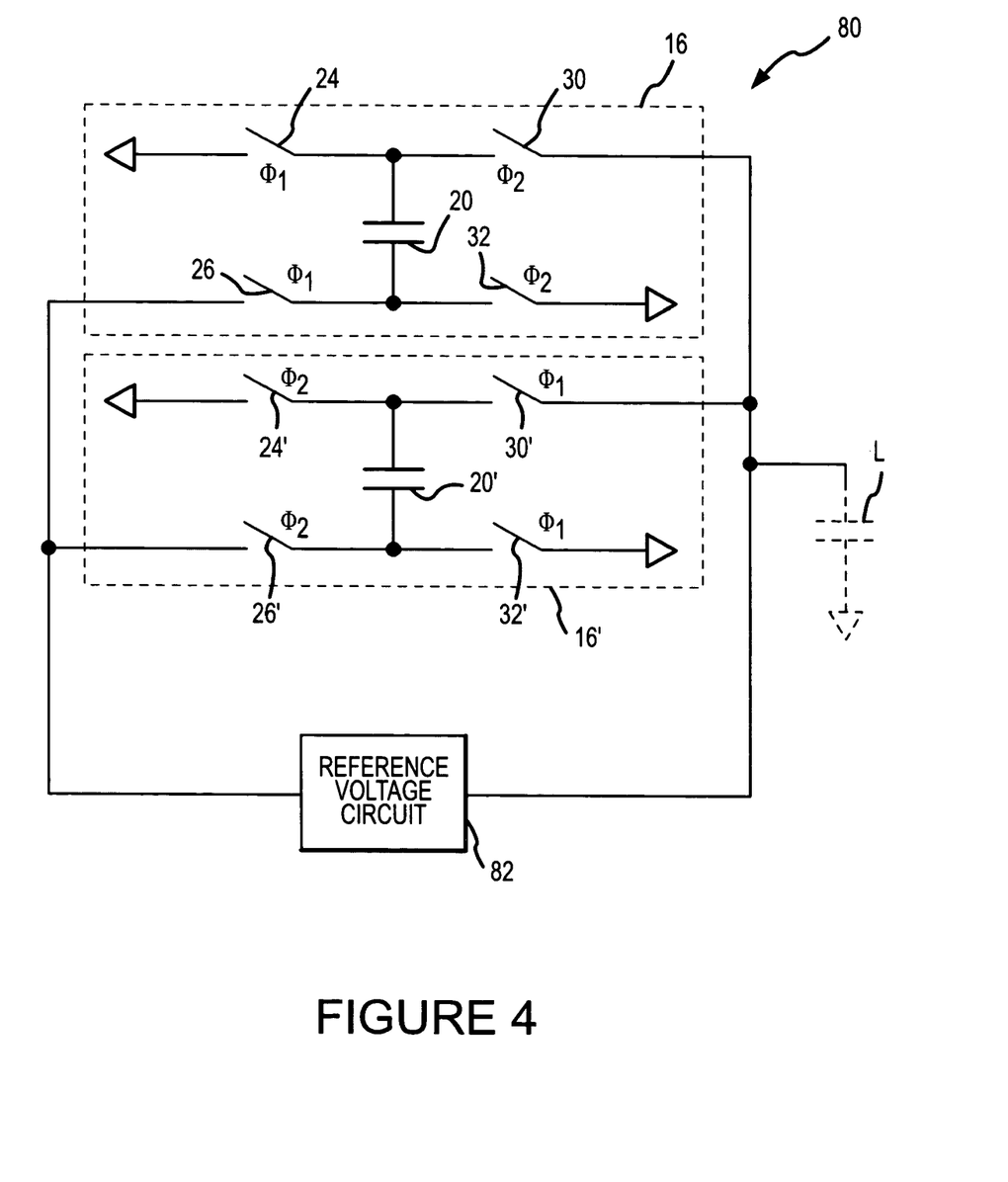
FIG. 4 is a schematic diagram of a charge pump according to another example of the invention in which the time constant of the charge pump is further reduced.

A charge pump 80 according to another example of the invention in which the time constant of the charge pump is further reduced is shown in FIG. 4. The charge pump 80 is identical to the charge pumps 40, 50 with one exception. First, in addition to containing a reference voltage circuit 82 connected to the voltage boost circuit 16 including the switches 24, 26, 30, 32 and the capacitor 20, it containing a second voltage boost circuit 16' including a second set of switches 24', 26', 30', 32' and a second capacitor 20'. The switches 24', 26', 30', 32' and second capacitor 20' have the same topography as the switches 24, 26, 30, 32 and the capacitor 20. Further, they operate in the same manner except that the switches 24', 26', 30', 32' are operated out of phase with the correspondingly numbered switches 24, 26, 30, 32. As a result, the first capacitor 20 applies a voltage to the load L during the second phase of each cycle, and the second capacitor 20' applies a voltage to the load L during the first phase of each cycle. Insofar as the charge pump 80 applies a voltage to the load during both phases, the charge pump 80 has half of the time constant of the charge pumps 40, 50 shown in FIGS. 2 and 3, respectively. Alternatively, the same time constant can be maintained using a capacitors 20, 20' that are only half the size of the capacitor 20 used in the charge pumps 40, 50.

Although not specifically shown in the drawings, it will be understood that the charge pumps 40, 50, 80 or a charge pump according to some other example of the invention can be easily adapted to provide a positive rather than negative load voltage $V_L$. Further, by adding additional switches and a capacitor, the charge pumps 40, 50 or a charge pump according to some other example of the invention can generate both a positive and a negative voltage.

Figure 5:
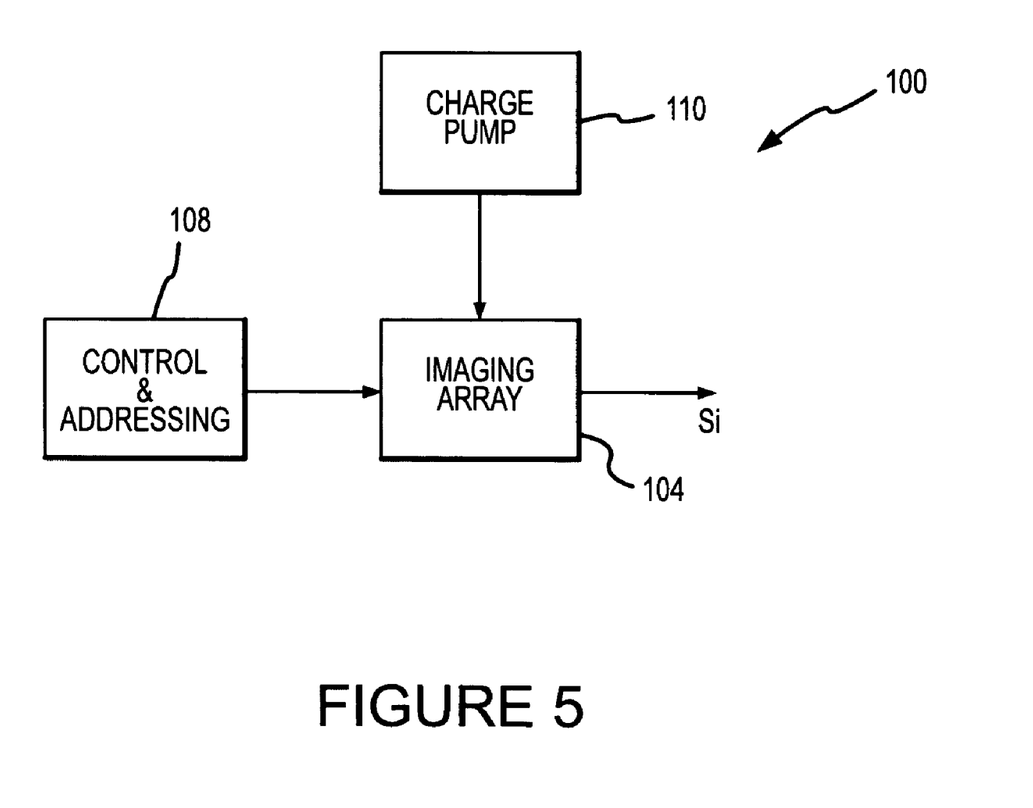
FIG. 5 is a block diagram of a CMOS imager using one or more of the charge pumps shown in FIGS. 2-4 or a charge pump according to another example of the invention.

The charge pumps 40, 50, 80 or a charge pump according to some other example of the invention can be used in a wide variety of applications. They are particularly suitable for use in a CMOS imager because the imaging arrays of such devices are highly capacitive. For example, a CMOS imager 100 shown in FIG. 5 includes a CMOS imaging array 104 that responds to a received image to generate corresponding signals. The array 104 is coupled to a control and addressing circuit 108, which interrogates the array 104 to output signals $S_I$ corresponding to the image received by the array 104. The CMOS imager 100 also includes a charge pump 110 connected to the array 104 to supply the array 104 with a negative voltage. The charge pump 100 may be one of the charge pumps 40, 50, 80 shown in FIGS. 2, 3 or 4, respectively, or a charge pump according to some other example of the invention.

Figure 6:
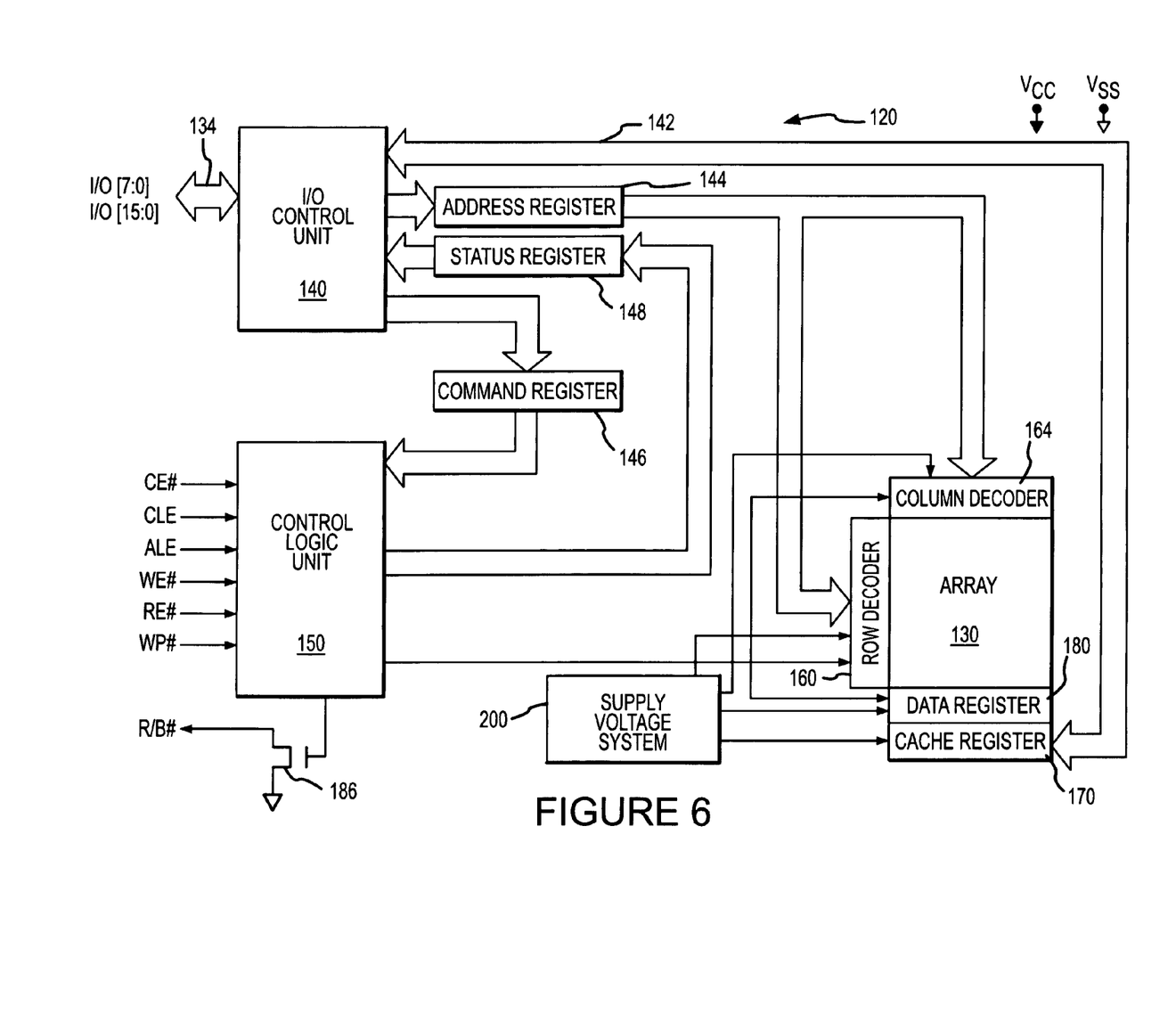
FIG. 6 is a block diagram of a memory device using one or more of the charge pumps shown in FIGS. 2-4 or a charge pump according to another example of the invention.

Another application of the charge pumps 40, 50, 80 or a charge pump according to some other example of the invention is to supply various voltages in a flash memory device. With reference to FIG. 6, a flash memory device 120 includes an array 130 of flash memory cells arranged in banks of rows and columns. Although not shown in FIG. 6, the flash memory cells in the array 130 have their control gates coupled to word select lines, drain regions coupled to local bit lines, and source regions selectively coupled to a ground potential.

Command signals, address signals and write data signals are applied to the memory device 120 as sets of sequential input/output ("I/O") signals transmitted through an I/O bus 134. Similarly, read data signals are output from the flash memory device 120 through the I/O bus 134. The I/O bus is connected to an I/O control unit 140 that routes the signals between the I/O bus 134 and an internal data bus 142, an address register 144, a command register 146 and a status register 148.

The flash memory device 120 also includes a control logic unit 150 that receives a number of control signals, including an active low chip enable signal CE#, a command latch enable signal CLE, an address latch enable signal ALE, an active low write enable signal WE#, an active low read enable signal RE#, and an active low write protect WP# signal. When the chip enable signal CE# is active low, command, address and data signals may be transferred between the memory device 120 and a memory access device (not shown). When the command latch enable signal CLE is active high and the ALE signal is low, the control logic unit 150 causes the I/O control unit 140 to route signals received through the I/O bus 134 to the command register 146 responsive to the rising edge of the WE# signal. Similarly, when the address latch enable signal ALE is active high and the CLE signal is low, the I/O control unit 140 routes signals received through the I/O bus 134 to the address register 146 responsive to the rising edge of the WE# signal. The write enable signal WE# is also used to gate write data signals from the memory access device (not shown) to the memory device 120, and the read enable signal RE# is used to gate the read data signals from the memory device 120 to the memory access device (not shown). The I/O control unit 140 transfers the write data signals and read data signals between the I/O bus 134 and the internal data bus 142 when the CLE and ALE signals are both low. Finally, an active low write protect signal WP# prevents the memory device 120 from inadvertently performing programming or erase functions. The control logic unit 150 is also coupled to the internal data bus 142 to receive write date from the I/O control unit for reasons that will be explained below.

The status register 148 can be read responsive to a read status command. After the read status command, all subsequent read commands will result in status data being read from the status register 148 until a subsequent read status command is received. The status data read from the status register 148 provides information about the operation of the memory device 120, such as whether programming and erase operations were completed without error.

The address register 146 stores row and column address signals applied to the memory device 120. The address register 146 then outputs the row address signals to a row decoder 160 and the column address signals to a column decoder 164. The row decoder 160 asserts word select lines corresponding to the decoded row address signals. Similarly, the column decoder 164 enables write data signals to be applied to bit lines for columns corresponding to the column address signals and allow read data signals to be coupled from bit lines for columns corresponding to the column address signals.

In response to the memory commands decoded by the control logic unit 150, the flash memory cells in the array 130 are erased, programmed, or read. The memory array 130 is programmed on a row-by-row or page-by-page basis. After the row address signals have been loaded into the address register 146, the I/O control unit 140 routes write data signals to a cache register 170. The write data signals are stored in the cache register 170 in successive sets each having a size corresponding to the width of the I/O bus 134. The cache register 170 sequentially stores the sets of write data signals for an entire row or page of flash memory cells in the array 130. All of the stored write data signals are then used to program a row or page of memory cells in the array 130 selected by the row address stored in the address register 146. In a similar manner, during a read operation, data signals from a row or page of memory cells selected by the row address stored in the address register 146 are stored in a data register 180. Sets of data signals corresponding in size to the width of the I/O bus 134 are then sequentially transferred through the I/O control unit 140 from the data register 180 to the I/O bus 134. Although the array 130 is typically read on a row-by-row or page-by-page basis, a selected portion of a selected row or page may be read by specifying a corresponding column address.

The flash memory device 120 also includes an NMOS transistor 186 having its gate coupled to receive a signal from the control logic unit 150. When the memory device 120 is busy processing a programming, erase or read command, the control logic unit 150 outputs a high signal to cause the transistor 186 to output an active low read/busy signal R/B#. At other times, the transistor 186 is turned OFF to indicate to a memory access device that the device 120 is able to accept and process memory commands.

The flash memory device 120 also includes supply voltage system 200 that uses one or more of the charge pumps 40, 50, 80 or charge pumps according to some other example of the invention. The charge pumps in the supply voltage system 200 applies positive and/or negative voltages having appropriate magnitudes to one or more of the row decoder 160, column decoder 164, cache register 170 or data register 180 to carry out erase, programming, or read operations in the array 130.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A charge pump, comprising:
   a voltage boost circuit coupled to receive an input voltage and structured to boost the input voltage to a boosted voltage having a magnitude or polarity that is different from that of the input voltage, the boosted voltage being applied to an output terminal; and
   an input voltage circuit coupled to the output terminal of the voltage boost circuit, the input voltage circuit comprising:
   a reference voltage source generating a reference voltage;
   a differential amplifier having an output terminal on which the input voltage is generated, the differential amplifier having a first input terminal and a second input terminal, the first and second input terminals being coupled to receive the reference voltage from the reference voltage source and a feedback signal, respectively, the differential amplifier being structured to generate the input voltage with a magnitude that is proportional to the difference between the magnitude of a reference voltage and the magnitude of the feedback voltage;
   a boosting sample circuit coupled to the output terminal of the voltage boost circuit to receive the boosted voltage, the boosting sample circuit being operable to generate the feedback voltage by periodically sampling the boosted voltage to generate respective samples and then generating the feedback voltage from the samples; and
   a capacitor coupled between the output terminal of the differential amplifier and the second input terminal of the differential amplifier.

2. The charge pump of claim 1 wherein the voltage boost circuit is structured to boost the input voltage to a boosted voltage having a polarity that is different from the polarity of the input voltage.

3. The charge pump of claim 1 wherein the input voltage circuit is structured to generate the input voltage with a magnitude that is substantially equal to the magnitude of a supply voltage until the magnitude of the boosted voltage is within a predetermined range of a target voltage.

4. The charge pump of claim 3 wherein the input voltage circuit is structured to generate the input voltage with a magnitude that is proportional to the difference between the magnitude of a reference voltage and the magnitude of the boosted voltage when the magnitude of the boosted voltage is within the predetermined range of the target voltage.

5. The charge pump of claim 1 wherein the input voltage circuit is structured to generate the input voltage with a magnitude that is equal to a multiple of the difference between the magnitude of the reference voltage and the magnitude of the boosted voltage.

6. The charge pump of claim 1 wherein the reference voltage source has first and second terminals, the first terminal being coupled to the output terminal of the voltage boost circuit to receive the boosted voltage, and wherein the has its first input terminal coupled to a fixed voltage and a second input terminal coupled to the second terminal of the reference voltage source.

7. The charge pump of claim 1 wherein the boosting sample circuit comprises:
   a capacitor having first and second terminals;
   a first switch coupled between the output terminal of the voltage boost circuit and the first terminal of the capacitor, the first switch being closed only during a first phase of each of a plurality of cycles;
   a second switch coupled between the second terminal of the capacitor and ground, the second switch being closed only during the first phase of each of the plurality of cycles;
   a third switch coupled between the first terminal of the capacitor and ground, the third switch being closed only during a second phase of each of the plurality of cycles; and
   a fourth switch coupled between the second input terminal of the differential amplifier and the second terminal of the capacitor, the second switch being closed only during the second phase of each of the plurality of cycles.

8. The charge pump of claim 1, further comprising an out-of-phase voltage boost circuit that is substantially identical to the voltage boost circuit, the out-of-phase voltage boost circuit being coupled in parallel with the voltage boost circuit and operating out of phase with the voltage boost circuit.

9. An imager, comprising:
   an imaging array structured to respond to a received image to generate corresponding output signals;
   a control and addressing circuit coupled to the imaging array, the control and addressing circuit being structured to interrogates the imaging array to cause the imaging array to output the signals corresponding to the image received by the imaging array; and
   a charge pump coupled to supply a boosted voltage to at least one of the imaging array and the control and addressing circuit, the charge pump comprising:
   a voltage boost circuit coupled to receive an input voltage and structured to boost the input voltage to the boosted voltage, the boosted voltage having a magnitude or polarity that is different from that of the input voltage; and an input voltage circuit coupled to the voltage boost circuit, the input voltage circuit comprising:
a reference voltage source generating a reference voltage;
a differential amplifier having an output terminal on which the input voltage is generated, the differential amplifier having a first input terminal and a second input terminal, the first and second input terminals being coupled to receive the reference voltage from the reference voltage source and a feedback signal, respectively, the differential amplifier being structured to generate the input voltage with a magnitude that is proportional to the difference between the magnitude of a reference voltage and the magnitude of the feedback voltage;
a boosting sample circuit coupled to the output terminal of the voltage boost circuit to receive the boosted voltage, the boosting sample circuit being operable to generate the feedback voltage by periodically sampling the boosted voltage to generate respective samples and then generating the feedback voltage from the samples; and
a capacitor coupled between the output terminal of the differential amplifier and the second input terminal of the differential amplifier.

10. The imager of claim 9 wherein the voltage boost circuit is structured to boost the input voltage to a boosted voltage having a polarity that is different from the polarity of the input voltage.

11. The imager of claim 9 wherein the input voltage circuit is structured to generate the input voltage with a magnitude that is substantially equal to the magnitude of a supply voltage until the magnitude of the boosted voltage is within a predetermined range of a target voltage.

12. The imager of claim 11 wherein the input voltage circuit is structured to generate the input voltage with a magnitude that is proportional to the difference between the magnitude of a reference voltage and the magnitude of the boosted voltage when the magnitude of the boosted voltage is within the predetermined range of the target voltage.

13. The imager of claim 9 wherein the input voltage circuit is structured to generate the input voltage with a magnitude that is equal to a multiple of the difference between the magnitude of the reference voltage and the magnitude of the boosted voltage.

14. The imager of claim 9 wherein the reference voltage source has first and second terminals, the first terminal being coupled to the voltage boost circuit to receive the boosted voltage, and wherein the a differential amplifier has its first input terminal coupled to a fixed voltage and a second input terminal coupled to the second terminal of the reference voltage source.

15. The imager of claim 9, further comprising a boosting sample circuit coupled to the voltage boost circuit to receive the boosted voltage, the boosting sample circuit being operable to generate the signal having a magnitude corresponding to magnitude of the boosted voltage by sampling the boosted voltage and then converting the boosted voltage to a signal having substantially the same magnitude as the boosted voltage but a polarity that is opposite the polarity of the boosted voltage.

16. The imager of claim 9, further comprising an out-of-phase voltage boost circuit that is substantially identical to the voltage boost circuit, the out-of-phase voltage boost circuit being coupled in parallel with the voltage boost circuit and operating out of phase with the voltage boost circuit.

17. A memory device, comprising:
an array of memory cells arranged in rows and columns; and
addressing circuitry coupled to receive an address, the addressing circuitry being structured to select memory cells in the array corresponding the received address;
a control logic unit coupled to the array of memory cells, the control logic being operable to carry out operations on the selected memory cells in the array corresponding to a memory command, the operations including at least one of erasing, programming and reading the memory cells in the array; and
a charge pump coupled to supply a boosted voltage to at least one of the array having a polarity that is different from the polarity of an input voltage, addressing circuitry and control logic unit, the charge pump comprising:
a voltage boost circuit coupled to receive the input voltage and structured to boost the input voltage to the boosted voltage, the boosted voltage having a magnitude or polarity that is different from that of the input voltage; and
an input voltage circuit coupled to the voltage boost circuit to receive the boosted voltage, the input voltage circuit being structured to generate the input voltage with a magnitude that is a function of the magnitude of the boosted voltage; the input voltage circuit comprising:
a reference voltage source generating a reference voltage;
a differential amplifier having an output terminal on which the input voltage is generated, the differential amplifier having a first input terminal and a second input terminal, the first and second input terminals being coupled to receive the reference voltage from the reference voltage source and a feedback signal, respectively, the differential amplifier being structured to generate the input voltage with a magnitude that is proportional to the difference between the magnitude of a reference voltage and the magnitude of the feedback voltage;
a boosting sample circuit coupled to the output terminal of the voltage boost circuit to receive the boosted voltage, the boosting sample circuit being operable to generate the feedback voltage by periodically sampling the boosted voltage to generate respective samples and then generating the feedback voltage from the samples; and
a capacitor coupled between the output terminal of the differential amplifier and the second input terminal of the differential amplifier.

18. The memory device of claim 17 wherein the input voltage circuit is structured to generate the input voltage with a magnitude that is substantially equal to the magnitude of a supply voltage until the magnitude of the boosted voltage is within a predetermined range of a target voltage.

19. The memory device of claim 18 wherein the input voltage circuit is structured to generate the input voltage with a magnitude that is proportional to the difference between the magnitude of a reference voltage and the magnitude of the boosted voltage when the magnitude of the boosted voltage is within the predetermined range of the target voltage.

20. The memory device of claim 17 wherein the input voltage circuit is structured to generate the input voltage with a magnitude that is equal to a multiple of the difference between the magnitude of the reference voltage and the magnitude of the boosted voltage.

21. The memory device of claim 17 wherein the reference voltage source has first and second terminals, the first terminal being coupled to the voltage boost circuit to receive the boosted voltage, and wherein the a differential amplifier has its first input terminal coupled to a fixed voltage and a second input terminal coupled to the second terminal of the reference voltage source.

22. The memory device of claim 17, further comprising a boosting sample circuit coupled to the voltage boost circuit to receive the boosted voltage, the boosting sample circuit being operable to generate the signal having a magnitude corresponding to magnitude of the boosted voltage by sampling the boosted voltage and then converting the boosted voltage to a signal having substantially the same magnitude as the boosted voltage but a polarity that is opposite the polarity of the boosted voltage.

23. The memory device of claim 17, further comprising an out of-phase voltage boost circuit that is substantially identical to the voltage boost circuit, the out-of-phase voltage boost circuit being coupled in parallel with the voltage boost circuit and operating out of phase with the voltage boost circuit.

24. The memory device of claim 17 wherein the memory cell array comprises a non-volatile memory cell array.

\* \* \* \* \*

UNITED STATES PATENT AND TRADEMARK OFFICE
CERTIFICATE OF CORRECTION

PATENT NO. : 7,535,281 B2
APPLICATION NO. : 11/540857
DATED : May 19, 2009
INVENTOR(S) : Espen Olsen Page 1 of 1

It is certified that error appears in the above-identified patent and that said Letters Patent is hereby corrected as shown below:

In column 8, line 25, in Claim 6, delete "the" and insert -- the differential amplifier --, therefor.

In column 9, line 52, in Claim 14, delete "the a" and insert -- the --, therefor.

In column 11, line 7, in Claim 21, delete "the a" and insert -- the --, therefor.

In column 12, line 7, in Claim 23, delete "out of-phase" and insert -- out-of-phase --, therefor.

Signed and Sealed this

Twenty-eighth Day of July, 2009

JOHN DOLL
*Acting Director of the United States Patent and Trademark Office*